(12) United States Patent
Suzuki (10) Patent No.: US 6,512,978 B2
(45) Date of Patent: Jan. 28, 2003

(54) VEHICLE TRAVELING POSITION DETECTING SYSTEM

(75) Inventor: Jun Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/931,873

(22) Filed: Aug. 20, 2001

(65) Prior Publication Data

US 2002/0022926 A1 Feb. 21, 2002

(30) Foreign Application Priority Data

Aug. 21, 2000 (JP) .................................. 2000-249475

(51) Int. Cl.[7] ................................................ B60Q 1/00
(52) U.S. Cl. ................... 701/207; 340/436; 340/905; 340/937; 324/933; 324/940; 180/168
(58) Field of Search ...................... 701/207; 340/436, 340/903, 905, 937; 324/207, 940, 933; 180/167, 168; 356/5.1

(56) References Cited

U.S. PATENT DOCUMENTS

| | | | | |
|---|---|---|---|---|
| 5,122,960 A | * | 6/1992 | Ooka | 33/356 |
| 5,191,528 A | * | 3/1993 | Yardley et al. | 180/168 |
| 5,957,983 A | * | 9/1999 | Tominaga | 701/23 |
| 6,208,268 B1 | * | 3/2001 | Scarzello et al. | 340/941 |
| 6,215,392 B1 | * | 4/2001 | Okada | 340/436 |
| 6,292,112 B1 | * | 9/2001 | Bader et al. | 340/941 |
| 6,336,064 B1 | * | 1/2002 | Honkura et al. | 701/23 |

FOREIGN PATENT DOCUMENTS

| | | | | |
|---|---|---|---|---|
| JP | 410103983 A | * | 4/1998 | |
| JP | 411095835 A | * | 4/1999 | |

* cited by examiner

Primary Examiner—William A. Cuchlinski, Jr.
Assistant Examiner—Tuan L To
(74) Attorney, Agent, or Firm—McGinn & Gibb, PLLC (57) ABSTRACT

A vehicle travelling position detecting system includes a plurality of magnetic sensors arranged on a vehicle for detecting magnetic fields generated by magnetic markers arranged on the road in the travelling direction of the vehicle to output detected magnetic field signal. A difference signal between the detected magnetic field signal and delayed magnetic field signal generated from the detected magnetic field signal allows reduction of the noise. The difference signal is used for calculating displacement of the vehicle with respect to the magnetic markers.

20 Claims, 11 Drawing Sheets

VEHICLE TRAVELING POSITION DETECTING SYSTEM

BACKGROUND OF THE INVENTION (a) Field of the Invention

The present invention relates to a vehicle traveling position detecting system. More particularly, the present invention relates to a vehicle traveling position detecting system, which is used in a lane marker system for guiding a vehicle along a desired pathway.

(b) Description of the Prior Art

In a lane marker system, a plurality of magnetic markers are arranged along a pathway of vehicles and a magnetic sensor array including a plurality of magnetic sensors are mounted aboard a traveling vehicle to guide the vehicle along the pathway while detecting the magnetic field distribution generated from the magnetic markers. The magnetic field distribution generated from the magnetic markers is detected for accurately assessing the vehicle position with respect to the pathway.

In the lane marker system, when the magnetic field distribution is detected by the magnetic sensors while the vehicle is traveling, many undesirable elements on the road may disturb the magnetic field. The magnetic disturbances raise problems such as erroneous detection, detection failure and detection accuracy deterioration in the lane marker system. To solve the above-mentioned problems various measures are proposed.

Figure 1:
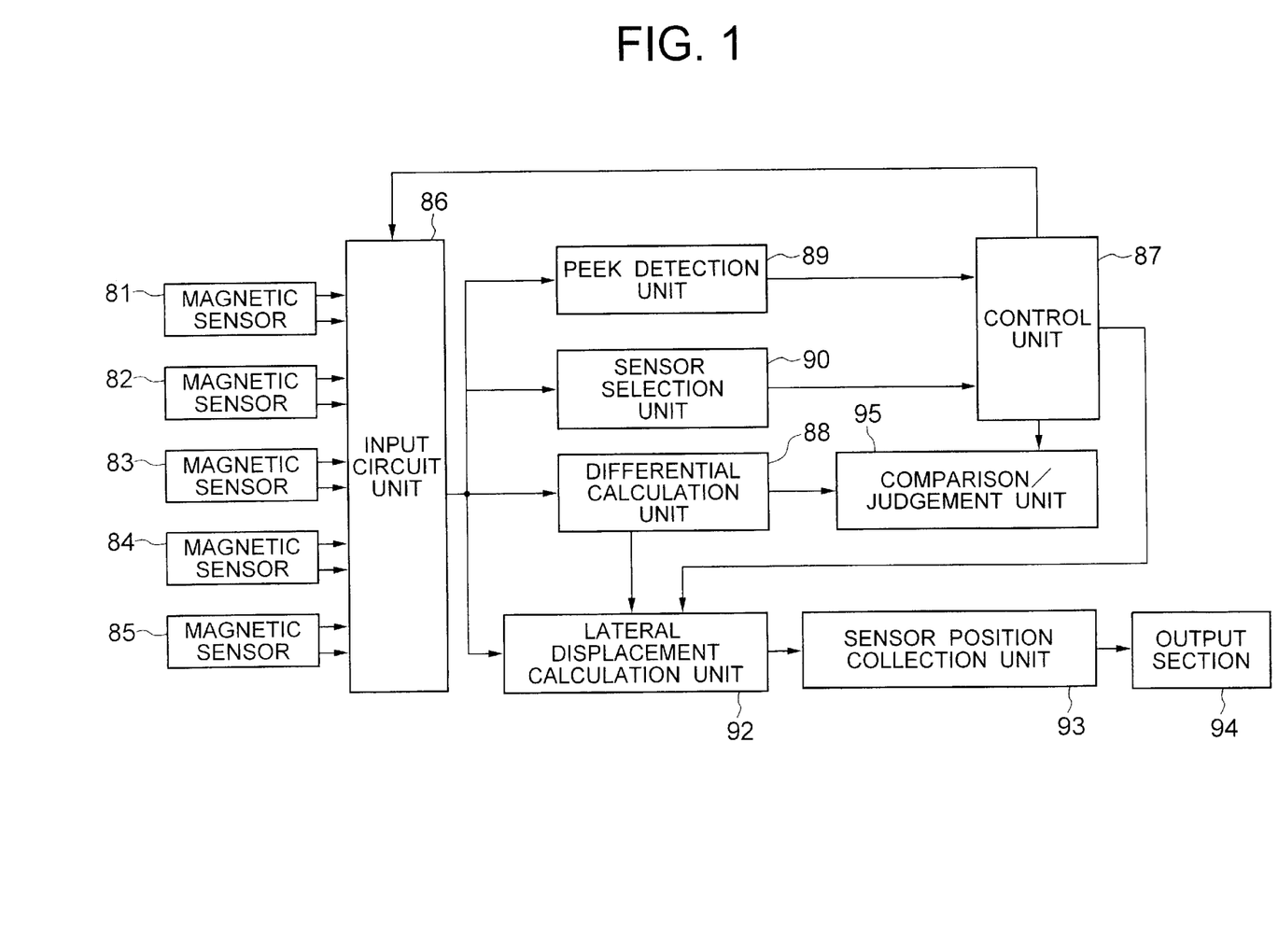
FIG. 1 is a block diagram of a conventional vehicle travelling position detecting system.

FIG. 1 is a block diagram of a vehicle traveling position detecting sensor described in Japanese Patent Laid-Open Publication No. Hei. 11-72304. As shown in FIG. 1, in the vehicle traveling position detecting system, five magnetic sensors 81 to 85 detect the magnetic field generated from magnetic markers that are arranged along a pathway of a traveling vehicle, whereby each sensor generates a detected magnetic field signal in accordance with the magnetic field thus detected. An input circuit unit 86 receives the detected magnetic field signals from the sensors 81 to 85 at different times and performs analog-to-digital (A/D) conversion of the detected magnetic field signals. After that, the input circuit unit 86 transmits the detected data, which is obtained by converting the analog signals into digital data, consecutively to a peak detection unit 89, a sensor selection unit 90, a differential calculation unit 88 and a lateral displacement calculation unit 92.

The differential calculation unit 88 differentiates the detected data and a comparison/judgement unit 95 compares the differentiated value (differential) of the detected data against a predetermined threshold value to determine whether the differentiated value is "larger" or "smaller" than the threshold value.

When the judgement result by the comparison/judgement unit 95 is "larger", a control unit 87 performs a control operation so that the input circuit unit 86 receives new detected signals from the sensors 81 to 85. When the judgement result is "smaller", the control unit 87 controls the lateral displacement calculation unit 92 based on signals from the peak detection unit 89 and the sensor selection unit 90. The lateral displacement calculation unit 92 temporarily stores the detected data and calculates the lateral displacement with respect to the magnetic markers. A sensor position correction unit 93 calculates the correction value with respect to the sensor position based on the lateral displacement, and an output unit 94 converts the correction value into an analog value using a D/A converter to output the analog correction value.

The conventional vehicle traveling position detecting system as described above is capable of obviating erroneously detected data, ascribable to a noise component included in the detected signals from the sensors 81 to 85 by using the processes including: comparing the differentiated value against the threshold value; judging that the detected signals are the signal components derived from the magnetic field distribution generated from the magnetic marker when the differentiated value is smaller than the threshold value; judging that the detected signals are the noise components when the differentiated value is larger than the threshold value; and separating the signal components from the noise components based on the results of the judgement.

The noise component described in the above publication using the conventional technology corresponds to a pulse noise component that disturbs the magnetic field distribution generated from the magnetic markers in a short fluctuation period. However, another pulse noise component, other than the above-described pulse noise component, also exists that disturbs the magnetic field distribution generated from the magnetic markers in a long fluctuating period. The conventional vehicle traveling position detecting system is not capable of detecting or removing the latter noise component.

SUMMARY OF THE INVENTION

It is therefore an object of the present invention to solve the above problem in the conventional technique and to provide a vehicle traveling position detecting system which is capable of detecting a lateral displacement with a high degree of accuracy while the vehicle is traveling on the road.

The present invention provides, in a first aspect thereof, a vehicle travelling position detecting system including a magnetic sensor mounted on a vehicle for detecting a magnetic field generated by one of magnetic markers arranged in a travelling direction of the vehicle to output a detected magnetic field signal, a speed sensor for detecting a travelling speed of the vehicle, a delay unit for delaying the detected magnetic field signal by a delay time calculated based on the detected travelling speed to output a delayed magnetic field signal, a subtracter for calculating a difference between the detected magnetic field signal and the delayed magnetic field signal to output a difference signal, a displacement calculating unit for calculating based on the difference signal a displacement of the vehicle with respect to the one of the magnetic markers in a lateral direction normal to the travelling direction.

The present invention also provides, in a second aspect thereof, a vehicle travelling position detecting system including a magnetic sensor mounted on a vehicle for detecting a magnetic field generated by one of magnetic markers arranged in a travelling direction of the vehicle to output a detected magnetic field signal, a speed sensor for detecting a travelling speed of the vehicle, a sample/hold circuit for sampling the detected magnetic field signal at a specified sampling period to output a series of sampled magnetic field signals, a first memory section for storing the series of sampled magnetic field signals, a subtracter for calculating a difference between each two of the series of sampled magnetic field signals sampled at a specified interval to output a series of difference signals, a second memory section for storing the series of difference signals, and a displacement calculating unit for calculating based on the series of difference signals a displacement of the vehicle with respect to the magnetic markers in a lateral direction normal to the travelling direction.

In accordance with the vehicle travelling position detection system of the present invention, noise existing in the magnetic filed from the magnetic marker and having a long term fluctuation period can be removed by the subtracter, whereby the difference signal has a higher accuracy of the detected magnetic field signal.

The above and other objects, features and advantages of the present invention will be more apparent from the following description, referring to the accompanying drawings.

DESCRIPTION OF THE PREFERRED EMBODIMENTS

A vehicle traveling position detecting system according to the present invention will be described in connection with the preferred embodiments of the present invention with reference to the drawings.

Figure 2:
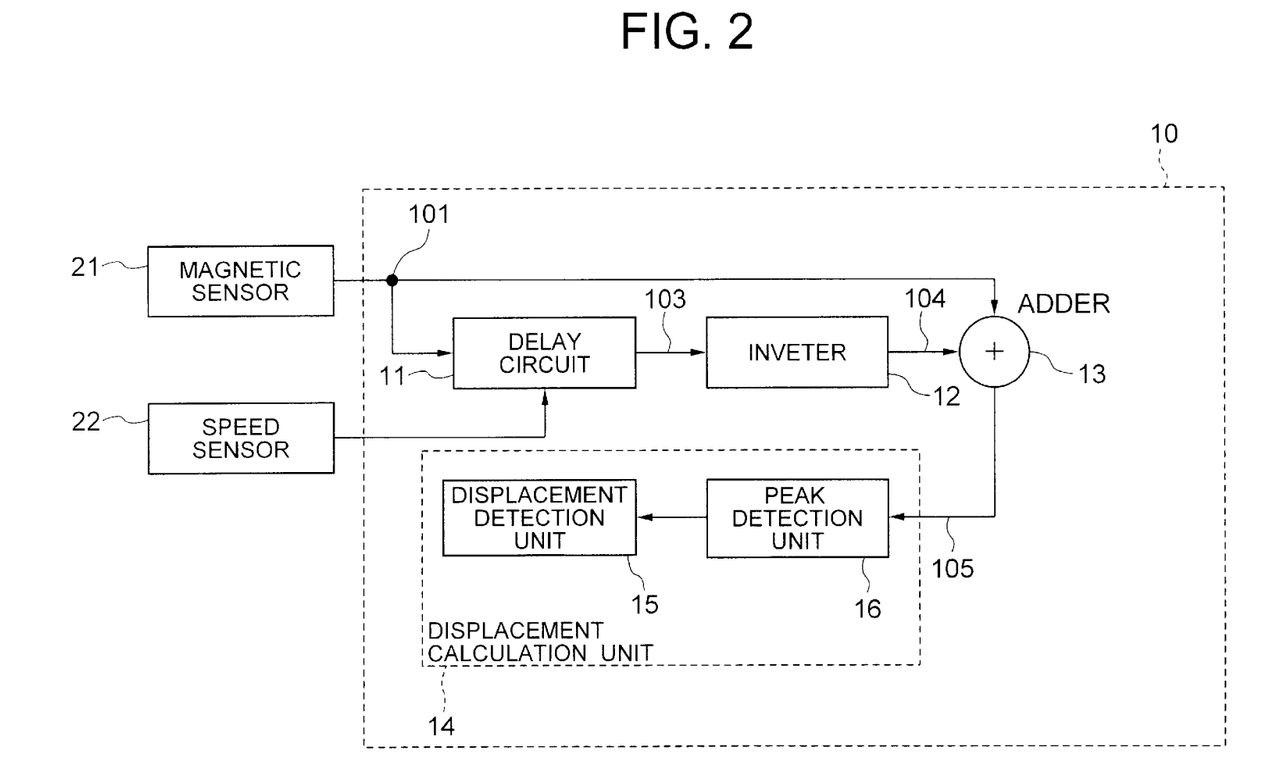
FIG. 2 is a block diagram of a vehicle travelling position detecting system according to a first embodiment of the present invention.

Referring to FIG. 2, a vehicle traveling position detecting system according to a first embodiment of the present invention is disposed on a traveling vehicle and includes a magnetic sensor 21, a vehicle speed sensor 22 and a signal calculation unit 10. The signal calculation unit 10 includes a delay circuit 11 for delaying the detected magnetic field signal 101 detected by the magnetic sensor 21, an inverting circuit or inverter 12 for inverting the signal 103 delayed by the delay circuit 11 to output an inverted signal 104, an adder 13 for adding the detected magnetic field signal 101 and the corresponding inverted signal 104 to generate a difference signal 105, and a displacement calculation unit 14 for calculating a lateral displacement of the vehicle based on the difference signal 105. The displacement calculation unit 14 includes a peak detection unit 15 and a displacement detecting unit 16.

Figure 3A:
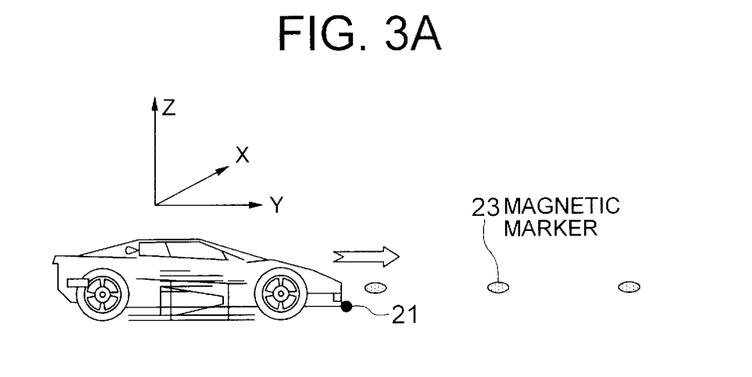
FIG. 3A is a schematic perspective view of a vehicle having the vehicle travelling position detection system of FIG. 1.
Figure 3B:
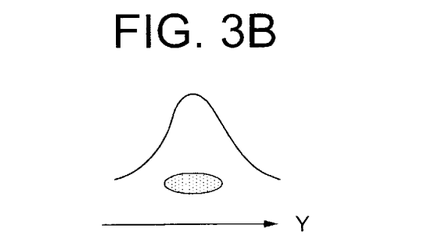
FIG. 3B shows a magnetic field distribution generated by a magnetic marker disposed on a road.

Referring to FIG. 3A showing a schematic view of a road on which a vehicle having the vehicle traveling position detecting system shown in FIG. 2 travels, a plurality of magnetic markers 23 are arranged on the road at predetermined intervals in the direction (Y-axis direction) in which the vehicle travels. Each of the magnetic markers 23 generates a magnetic field having a peak of a predetermined level in the vertical direction (Z-axis direction) with respect to the road surface. The magnetic sensor 21 is mounted at a predetermined position on the vehicle (for example, at the front bumper or the rear bumper of the vehicle) and detects the magnetic field generated from each of the magnetic markers 23, such as shown in FIG. 3B.

Figure 4:
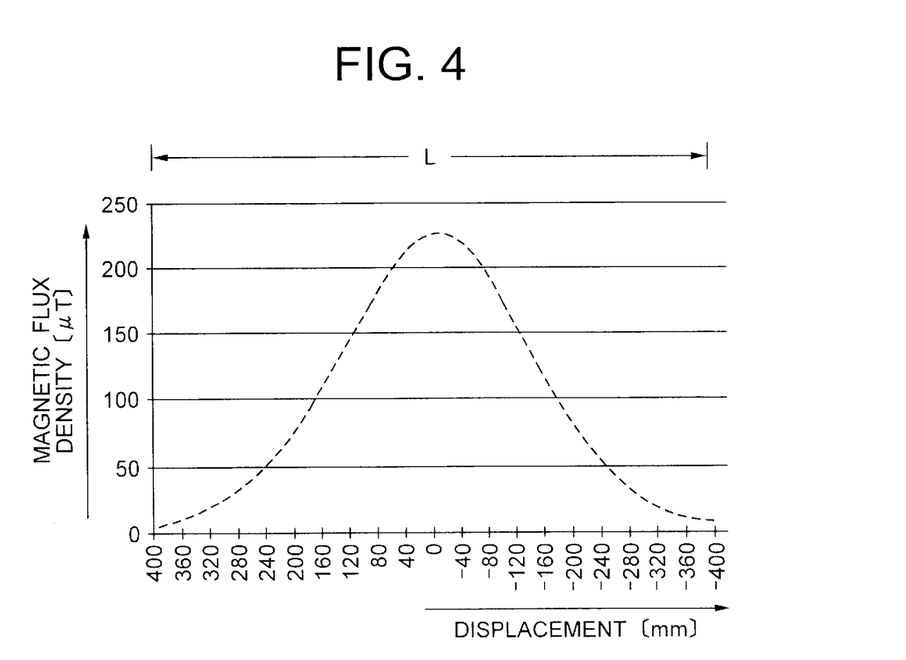
FIG. 4 is a graph showing magnetic flux density vs. displacement of the vehicle with respect to the magnetic marker.

Referring to FIG. 4 illustrating the output of the magnetic sensor 21 which detects the magnetic field distribution generated from the magnetic marker 23. The magnetic field distribution is measured under the condition that the magnetic sensor keeps a constant position in the Z-axis direction and moves along the straight line drawn in the Y-axis direction by connecting each central point of the magnetic markers 23, or the original point on the X-axis. The magnetic sensor detects the magnetic field distribution generated from each of the magnetic markers 23 during the movement of the vehicle. The detected magnetic field distribution indicates a maximum magnetic flux density at the central position of each magnetic marker 23 in the Y-axis direction and a gradual decrease in the magnetic flux density substantially in proportion to the distance from the central position, as shown in FIG. 4. The detectable distance of the magnetic sensor in the direction in which the vehicle traveling is represented by "L" in this text, the detectable distance being a distance in the travelling direction between both ends of the area where the magnetic sensor effectively detects the magnetic field of the magnetic marker 23.

As seen from FIG. 4, the detectable distance "L" is, for example, 800 [mm]. Thus, assuming that the travelling velocity (or speed) "V" of the vehicle is 100 [km/h], the detectable time length Ta for the magnetic field is 28.8 [ms], with reference to the equation "Ta=L/V".

To calculate the lateral displacement of the traveling vehicle, either a map identification technique or a mathematical calculation technique is available. The vehicle traveling position detecting system shown in FIG. 2 employs the map identification method. In this case, before calculating the lateral displacement, the detecting system measures the magnetic field distribution generated by the magnetic marker and stores the data in the system as map information. Based on the signal, detected by the magnetic sensor 21 while the vehicle is traveling, and the map information, the position of the magnetic sensor 21 in the Y-axis direction is calculated and then the displacement of the traveling vehicle in the X-axis direction with respect to the central point of the magnetic marker 23 in the lateral direction is determined.

Figure 5A:
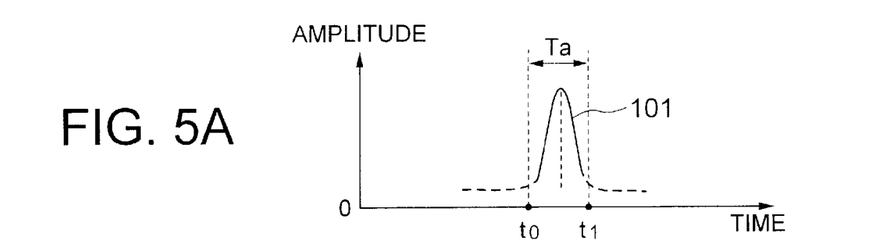
FIGS. 5A to 5D are signal waveforms in the vehicle travelling position detecting system of FIG. 2.

The signals processed by the vehicle traveling position detecting system of the present embodiment have respective waveforms such as shown in FIGS. 5A to 5D. The magnetic sensor 21 converts the magnetic flux density of the magnetic field from the magnetic markers into a voltage or current signal as a detected magnetic field signal 101, and supplies the detected magnetic field signal 101 as an addend to the adder 13. As shown in FIG. 5A, the detected magnetic field signal 101 has a sine waveform in which a peak having a positive polarity is located between time instants $t_0$ and $t_1$, or within the detectable time length Ta. The magnetic sensor 21 has an input-output characteristic in which the level of the detected magnetic field signal 101 varies linearly in proportion to the magnetic flux density.

Figure 5B:
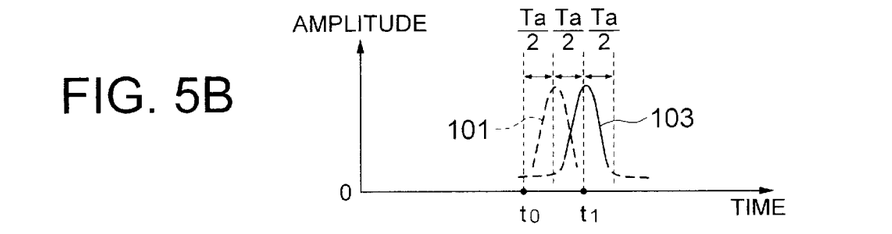

The vehicle speed sensor 22 detects the traveling speed of the vehicle and supplies the information of this speed as a detected speed signal 102 to the delay circuit 11. The delay circuit 11 calculates the detectable time length Ta based on the detected speed signal 102 and supplies a delayed magnetic field signal 103 to the inverter 12. As shown in FIG. 5B, the delayed magnetic field signal 103 has a delay time of Ta/2 with respect to the detected magnetic field signal 101 and a sine waveform in which a peak having a positive polarity is located between time instants $t_0+(Ta/2)$ and $t_1+(Ta/2)$. The delay time Ta/2 of the delayed magnetic field signal 103 is such that when the delayed magnetic field signal 103 is subtracted from the detected magnetic field signal 101, the noise signal component of the resultant signal is suppressed. That is, this suppressing has substantially no effect on the signal component included in the detected magnetic field signal 101 and derived from the magnetic marker, whereas the suppression has an effect on the noise component having a long fluctuation period included in the detected magnetic field signal 101.

Figure 5C:
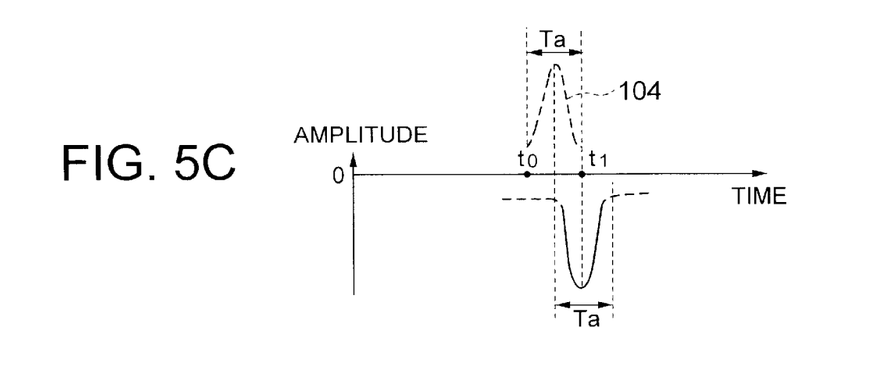

The inverter 12 inverts the delayed magnetic field signal 103 to output an inverted magnetic field signal 104, and supplies it as an augend to the adder 13. As shown in FIG. 5C, the inverted magnetic field signal 104 has a sine waveform in which a peak having a negative polarity is located between time instants $t_0+(Ta/2)$ and $t_1+(Ta/2)$.

Figure 5D:
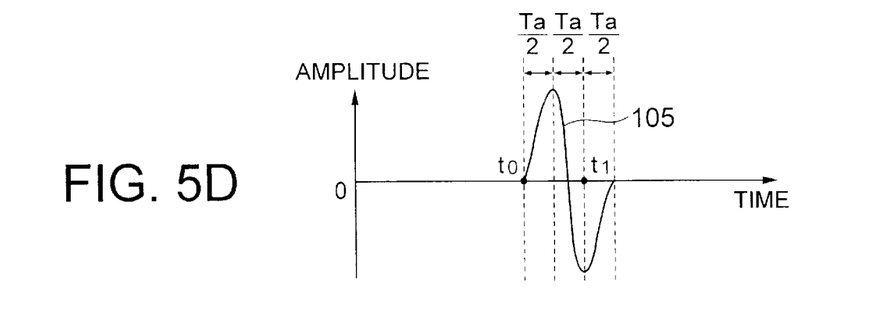

The adder 13 adds. the inverted magnetic field signal 104 to the detected magnetic field signal 101 to output a difference signal 105, and supplies the same to the displacement calculation unit 14. As shown in FIG. 5D, the difference signal 105 has a substantially sine waveform in which a peak having a positive polarity is located between time instants $t_0$ and $t_0+(3Ta/4)$, and another peak having a negative polarity is located between time instants $t_0+(3Ta/4)$ and $t_1+(Ta/2)$.

Figure 6:
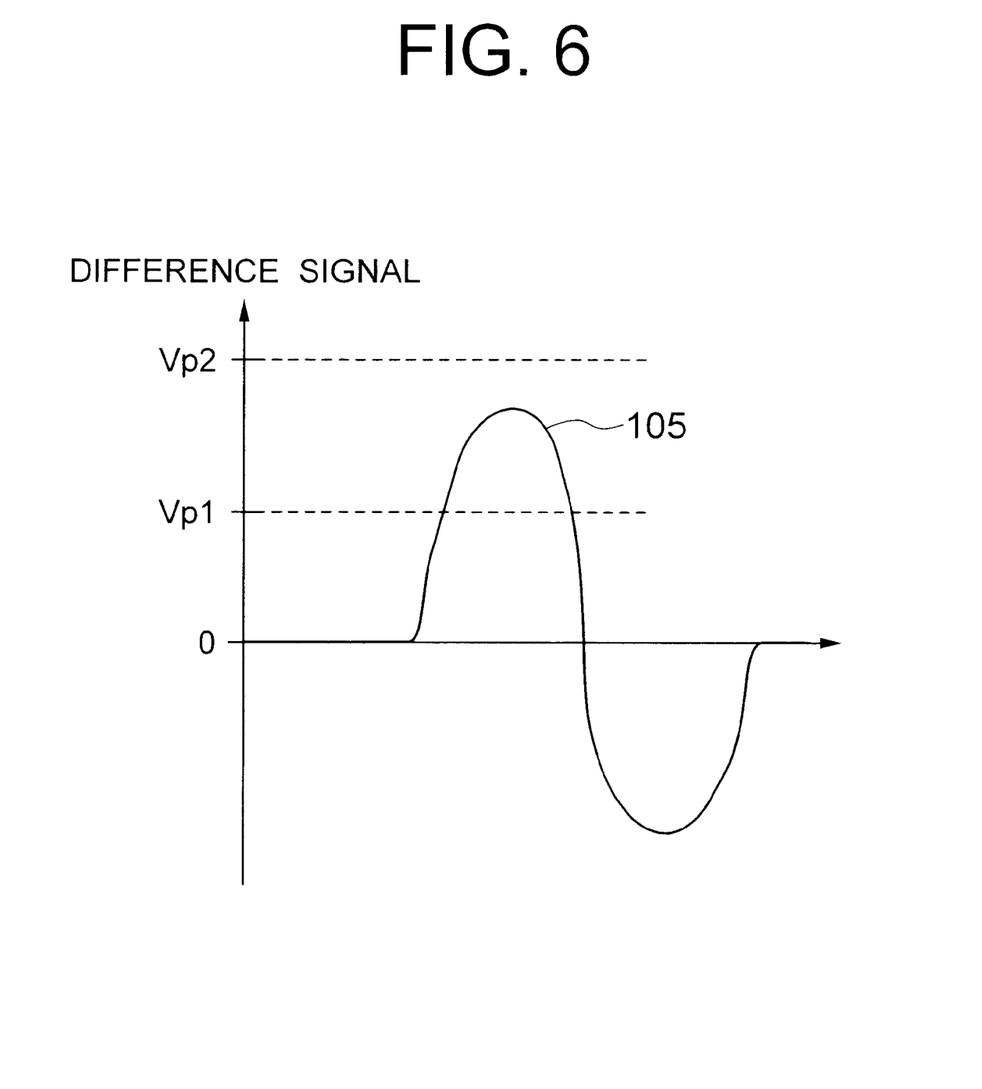
FIG. 6 is a waveform of the difference signal.

The operation of the peak detection unit 16 that processes the difference signal 105 is described with reference to FIG. 6. The peak detection unit 16 samples the level of the difference signal 105 successively and detects whether or not the sampled value exceeds the threshold value, $V_{p1}$ or $V_{p2}$. The lower threshold value $V_{p1}$ is set to be higher than the level of the noise component having a small amplitude, and in addition, the lower threshold value $V_{p1}$ is set to be a boundary value between the signal component derived from the magnetic marker and the noise-component. The higher threshold value $V_{p2}$ is set to be higher than the level of the maximum value of the signal component that is generated from the magnetic marker and can be detected. In addition, the higher threshold value $V_{p2}$ is set to be a boundary value between the signal component derived from the magnetic marker and the noise component having a large amplitude. When the sampled value exceeds the lower threshold value $V_{p1}$, the peak detection unit 16 holds the lower threshold value $V_{p1}$ as a latched value and then starts a peak detecting operation.

In the peak detecting operation, the sampled value is compared against the latched value and when the sampled value is equal to or higher than the latched value, the sampled value is held as a new latched value. In this operation, when the sampled value is higher than the higher threshold value $V_{p2}$ or the time length of Ta has passed after the start of the peak detecting operation, the peak detecting operation is completed. On completing the peak detecting operation, the peak detection unit 16 supplies the latched value to the displacement detecting unit 15.

Figure 7:
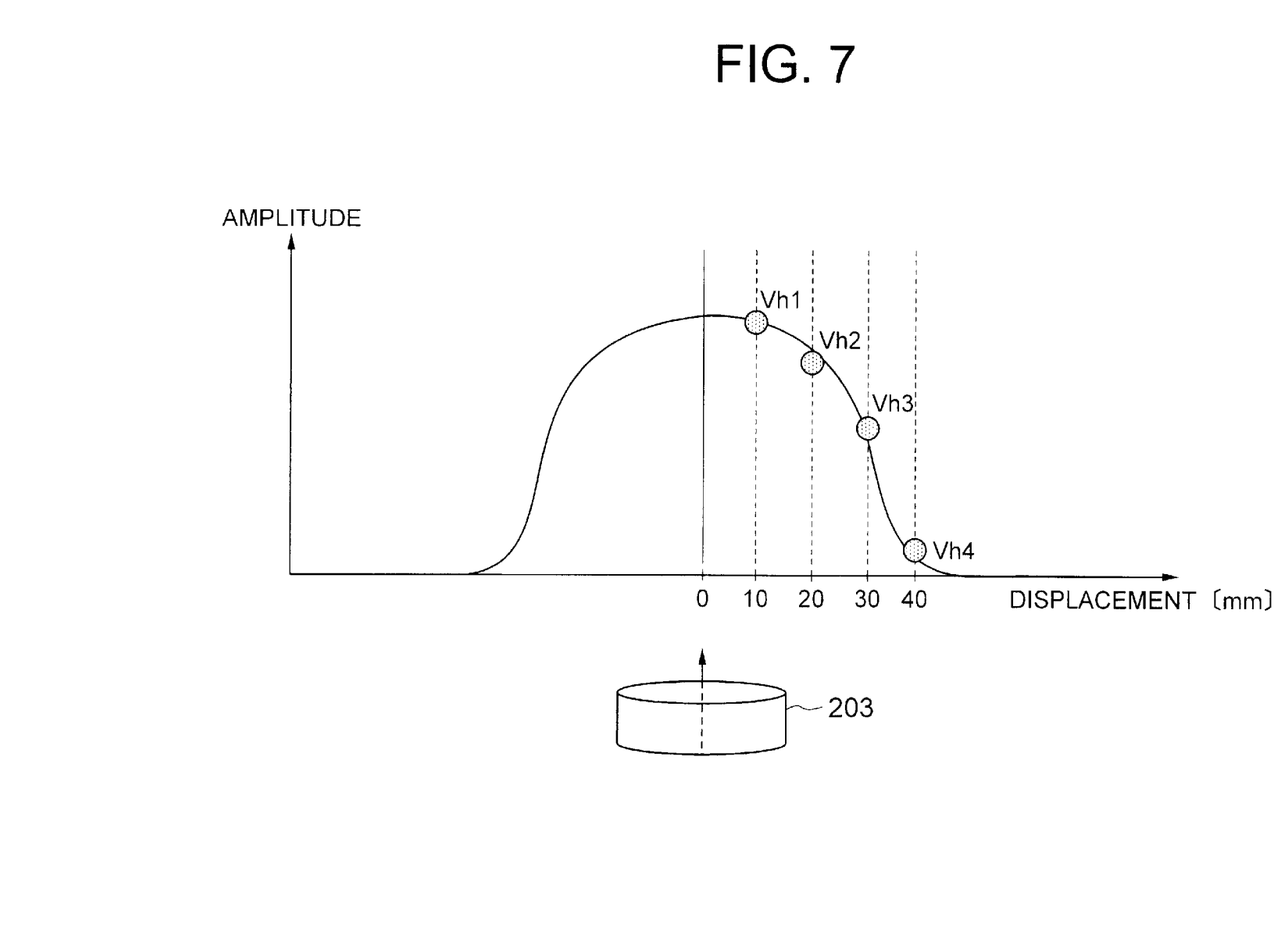
FIG. 7 is a graph showing map information used in the displacement calculation unit.

The operation of the displacement calculating unit 14 that calculates the lateral displacement is described with reference to FIG. 7. The displacement detecting unit 15 converts the latched value into the lateral displacement with respect to the central position of the magnetic marker based on the map information stored in advance. For example, when the latched value is $V_{h1}$, it is converted to the lateral displacement of 10 [mm] and, in a similar manner, when the latched value is $V_{h4}$, it is converted to the lateral displacement of 40 [mm]. The displacement calculation unit 14 determines the lateral position of a traveling vehicle based on the resultant lateral displacement.

The accuracy of the detecting operation performed by this system may be improved further by employing the following method. That is, both the vertical component and the horizontal component of the magnetic field distribution generated from the magnetic marker with respect to the road are detected, and the map information of the two components in two directions is stored in advance. Furthermore, if the map information to be stored is strengthened by adding the ratio of the vertical component to the horizontal component, even when one component out of the two components is disturbed by strong external magnetic interference, the one component can be calculated by applying the stored ratio to the other normal component.

Figure 8:
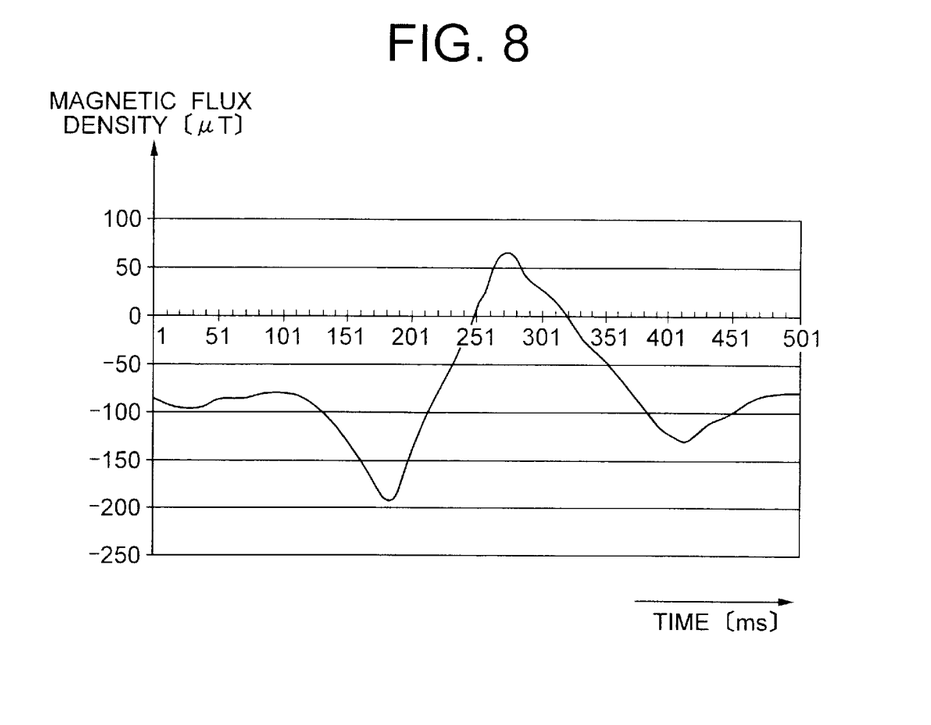
FIG. 8 is a graph showing an example of the noise component existing on the road.

Referring to FIG. 8 illustrating the waveform of the noise component generated by disturbances on the road, the noise component has a negative peak level at a time of about 180 [ms], a positive peak level at a time of about 270 [ms] and another negative peak level at a time of about 410 [ms] after the start of measurement.

Figure 9:
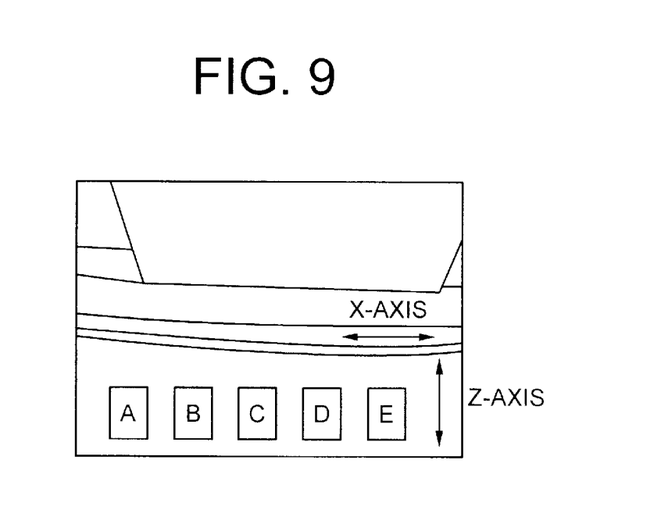
FIG. 9 is front view of the vehicle showing the arrangement of the magnetic sensor array.

Referring to FIG. 9 illustrating a rear view of the vehicle showing an exemplified arrangement of a magnetic sensor array including the magnetic sensor 21 used for measuring the magnetic field from the magnetic marker as well as the noise component shown in FIG. 8, the magnetic sensor array includes five sensors A to E which are arranged on the rear bumper in the X-axis direction. Each of the sensors detects the magnetic flux density of the magnetic field generated from the magnetic markers. Each of the sensors A to E is a two-axis measurement sensor capable of detecting the magnetic field components in both X-axis and Z-axis directions. From the outputs of the five magnetic sensors A to E, one output indicating the maximum detected magnetic field signal is selected.

A geomagnetic level is detected as a direct component of about 30 to 50 micro tesla [$\mu$T]. On the road, there exists road-related structures, made of such materials as reinforcing steel, which generate external magnetic interference that depends largely on the environment where the magnetic marker is to be installed. As shown in FIG. 8, the noise component existing on the road disturbs the magnetic field distribution generated by the magnetic marker in a long fluctuation period.

Figure 10:
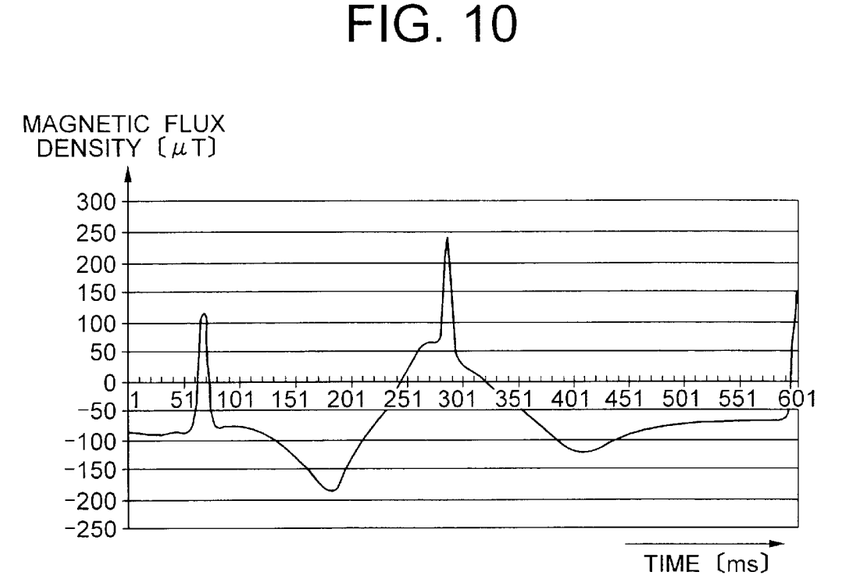
FIG. 10 is a graph showing detected magnetic field signal superimposed with the noise component.

FIG. 10 illustrates an example of the synthesized waveform generated by superimposing the noise component shown in FIG. 8 and the detected magnetic field signal 101. The detected magnetic field signal 101 has the same value as that of the waveform indicated in FIG. 4 having the same maximum magnetic flux density of about 220 [$\mu$T]. The detected magnetic field signal 101 has a first peak at a time of about 70 [ms], a second peak at a time of about 290 [ms] and a third peak at a time of about 600 [ms] after the start of measurement. The detected magnetic field signal 101 indicates absolute level differences between each two of the first, second and third peaks affected by the noise component existing on the road.

Figure 11:
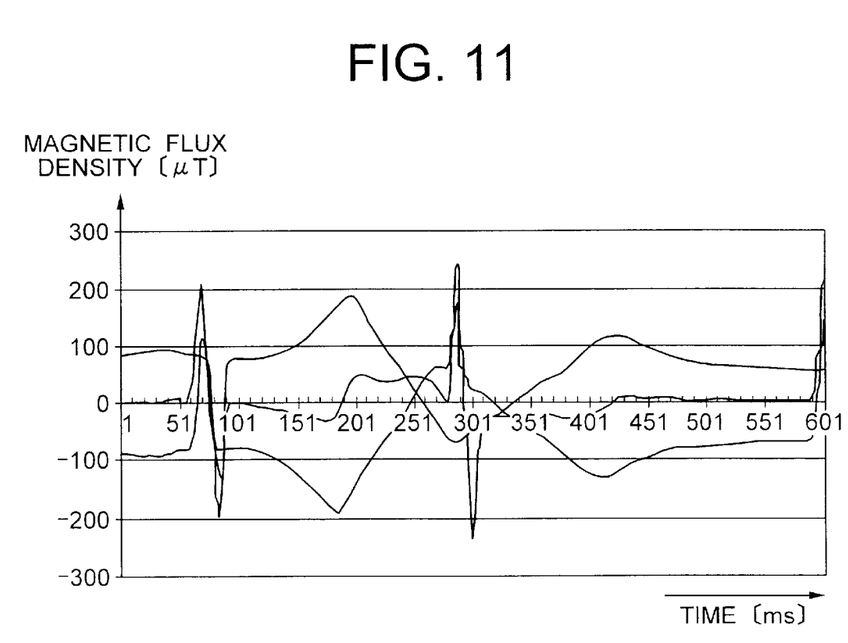
FIG. 11 is a graph showing the detected magnetic field signal, the inverted magnetic field signal and the difference signal.

FIG. 11 illustrates an example of a combination of waveforms for the detected magnetic field signal 101, the inverted magnetic field signal 104 and the difference signal 105. The inverted magnetic field signal 104 and the difference signal 105 are the resultant signals produced after the traveling position detecting system processed the detected magnetic field signal 101 shown in FIG. 10. In FIG. 11, the detected magnetic field signal 101, the inverted magnetic field signal 104 and the difference signal 105 are superimposed on each other.

Figure 12:
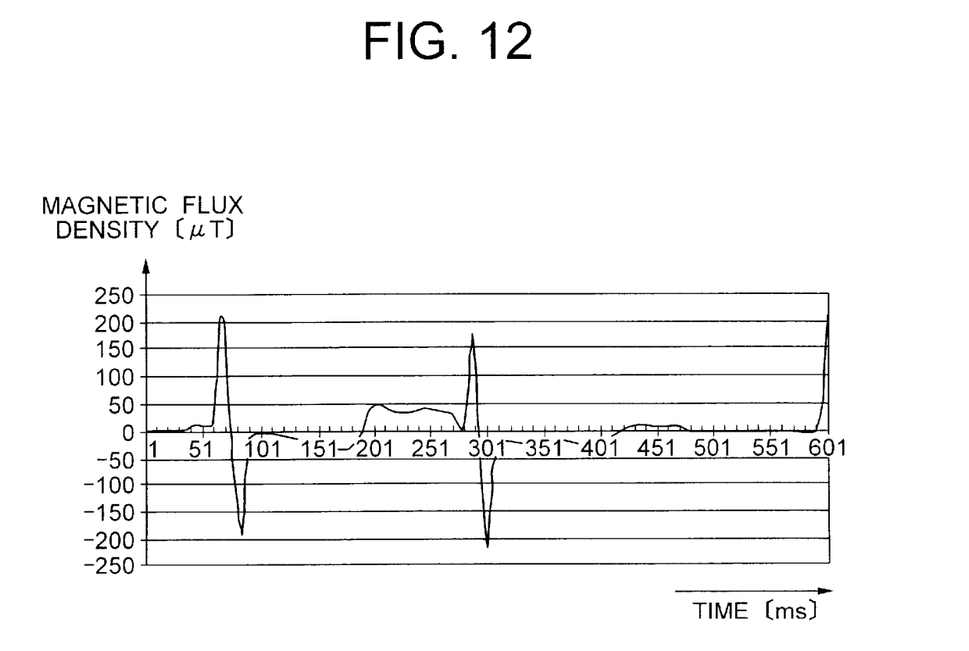
FIG. 12 is a graph again showing the difference signal shown in FIG. 11.

FIG. 12 illustrates a waveform of the difference signal 105 shown in FIG. 11. As is seen in the waveform of the difference signal 105, the noise components included in the detected magnetic field signal 101 are suppressed and thus the levels of the first, second and third peaks show substantially no difference between the absolute values thereof.

According to the above described embodiment, after the system detects the magnetic field signal of the magnetic markers, the system subtracts the delayed magnetic field signal having a predetermined delay time from the detected magnetic field signal. In this way the noise component resulting from the external magnetic interference is eliminated from the detected magnetic field signal. Consequently, the highly accurate detection of the traveling position of the vehicle on the road can be achieved.

Figure 13:
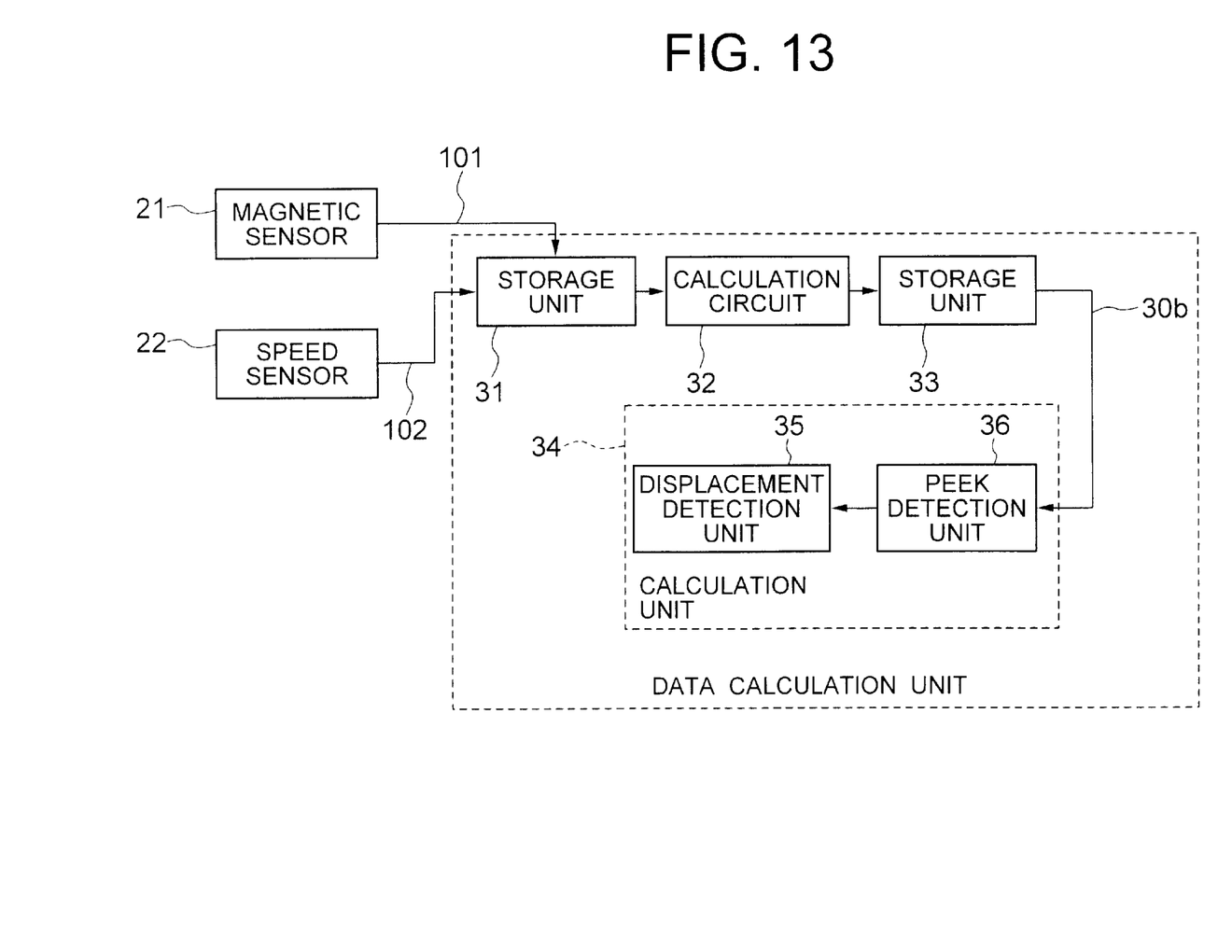
FIG. 13 is a block diagram of a vehicle travelling position detection system according to a second embodiment of the present invention.

Referring to FIG. 13, a vehicle traveling position detecting system according to a second embodiment of the present invention is similar to the first embodiment except that the calculation process of the lateral displacement is different from that of the first embodiment as follows. The second embodiment employs digital processing performed by a data calculation unit 30 instead of the analog processing performed by the signal calculation unit 10 employed in the first embodiment. The data calculation unit 30 includes a storage unit 31, a calculation circuit 32, a storage unit 33 and a calculation unit 34. The calculation unit 34 includes a peak detection unit 35 and a displacement detecting unit 36.

In the data calculation unit 30, the detected magnetic field signal 101 from the magnetic sensor 21 and the detected speed signal 102 from the vehicle speed sensor 22 are digitally processed and converted to digital signals. Then, the digitally processed signals are output as difference signal data 306 to the calculation unit 34.

Figure 14:
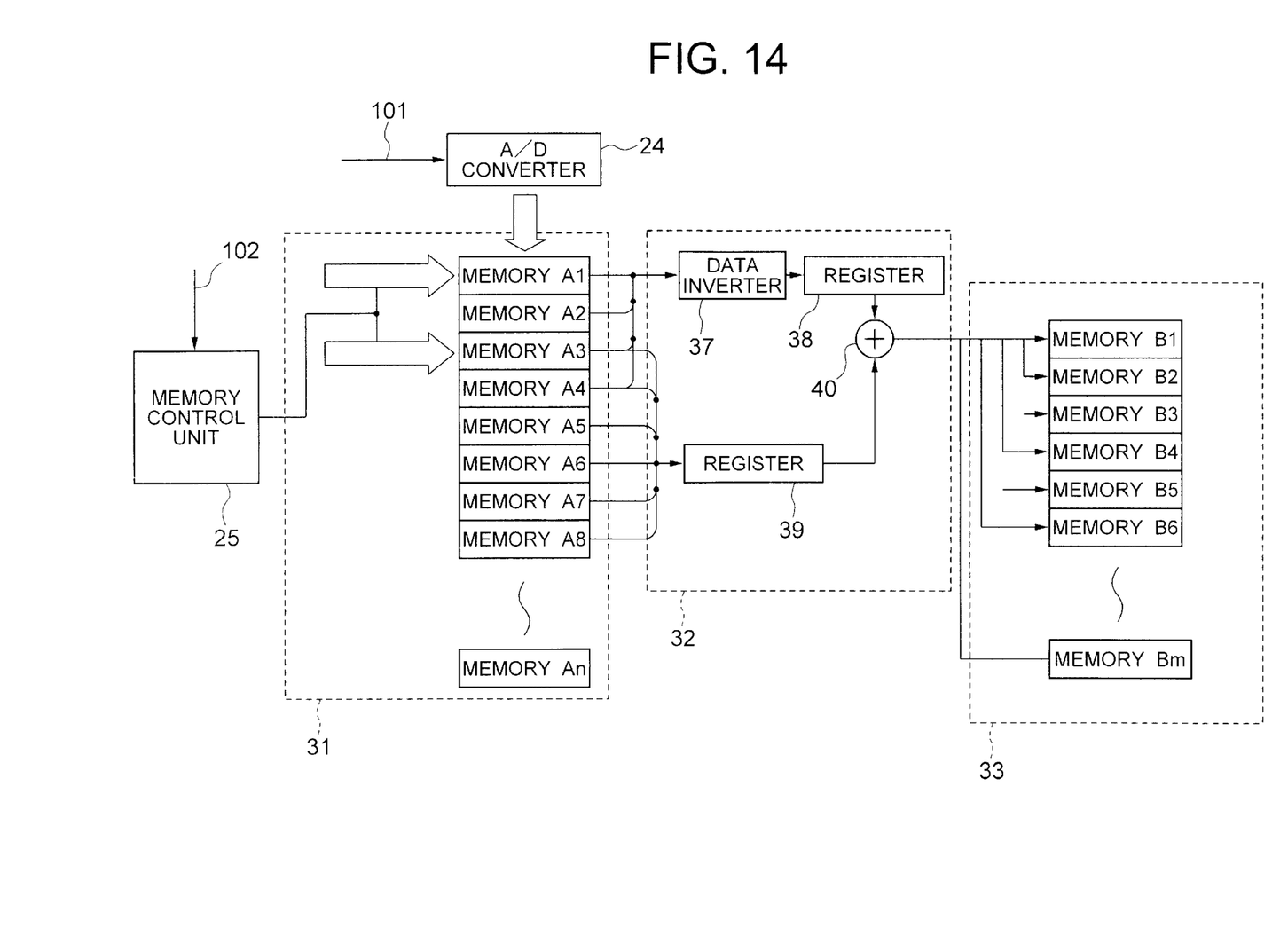
FIG. 14 is a detailed block diagram of principal units in the data calculation unit of FIG. 13.

FIG. 14 illustrates an example of the storage unit 31, the calculation circuit 32 and the storage unit 33 shown in FIG. 13. The storage unit 31 includes a plurality (n) of memory blocks A1 to An. The calculation circuit 32 includes a data inverter 37, a first register 38, a second register 39 and an adder 40. The storage unit 33 includes a plurality (m) of memory blocks B1 to Bm. The data calculation unit 30 further includes an A/D converter 24 and a memory control unit 25.

The memory control unit 25 calculates the detectable time length Ta for the detected magnetic field signal based on the detected speed signal 102 and controls the A/D converter 24 and the memory blocks A1 to An. The A/D converter 24 samples the detected magnetic field signal 101 at sampling intervals of Ts and converts the sampled data over the time length of 2×Ta to supply the n pieces of converted data to the storage unit 37.

The memory control unit 25 calculates the number (n) of pieces of data to be converted in accordance with the speed of the traveling vehicle (n=2×Ta/Ts). For example, supposing that Ta is 40 [ms] and Ts is 10 [ms], n is set at 8. Based on the calculated n (=8), the memory control unit 25 performs the control operation and the eight pieces of converted data are stored separately in the memory blocks A1 to A8.

The memory control unit 25 performs the following operation. A predetermined value (x) is calculated (x=n/4) so that the relative position of a (i+x)-th memory block A(i+x) is determined with respect to the position of an i-th memory block Ai. Since n is 8, x is calculated in accordance with the above calculation formula and set at 2.

The memory control unit 25 starts a first subtraction processing, and the stored data of the memory block A1 as a "subtracter data" and the stored data of the memory block A3 as a "minuend data" are supplied to the calculation circuit 32. In the calculation circuit 32, the subtracter data is inverted by the data inverter and supplied to the first register 38 as the data with an inverted sign, and the minuend data is supplied to the second register 39. The adder 40 adds the stored data of the first register 38 and the stored data of the second register 39, and supplies the added data to the storage unit 33. In the storage unit 33, when the memory block B1 receives the added data, the first subtraction processing is completed.

As is the case with the first subtraction processing, the subtraction processing from the second subtraction processing and subsequent subtraction processings are performed using the results of previous subtraction processing operations. In total, six (i=1~6) subtraction processing operations are performed. That is, in the second subtraction processing, the stored data of the memory blocks A2 and A4 are processed as subtracter data and minuend data respectively; in the third subtraction processing, the stored data of the memory blocks A3 and A5 are processed as subtracter data and minuend data respectively; in the fourth subtraction processing, the stored data of the memory blocks A4 and A6 are processed as subtracter data and minuend data respectively; in the fifth subtraction processing, the stored data of the memory blocks A5 and A7 are processed as subtracter data and minuend data respectively; in the sixth subtraction processing, the stored data of the memory blocks A6 and A8 are processed as subtracter data and minuend data respectively.

In the data calculation unit 30, when the subtraction processing from the first to the sixth are completed, the stored data of the memory blocks B1 to B6 are output to the calculation unit 34 as difference signal data 306. In the calculation unit 34, the difference signal data 306 is digitally processed and converted to digital data, and the lateral position of a traveling vehicle is determined as is the case in the displacement calculation unit 14 of FIG. 2.

It is assumed here that the detectable distance is L, the speed of a traveling vehicle is V and the sampling interval is Ts. The number (m) of memory blocks in the storage unit 33 is equal to or greater than 1.5×L/(V×Ts), and the number n of memory blocks in the storage unit 31 is equal to 2×m/1.5.

Furthermore, in the vehicle traveling position detecting system shown in FIG. 13, if the sampling number used in sampling the detected magnetic field signal is increased or, in other expression, the sampling interval Ts of the A/D converter 21 is reduced, the system can detect the lateral displacement with increased accuracy.

According to the above described embodiment, as the external magnetic interference can be removed from the detected magnetic field signal by performing the digital processing, the system can detect the lateral displacement with ease and a high level of accuracy.

Although the above described embodiments employ the one-axis measurement sensor capable of detecting the magnetic field distribution in the Z-axis direction. When the embodiments employ a two-axis measurement sensor array capable of detecting the magnetic field distribution in both the X-axis and Z-axis directions or a three-axis measurement sensor array capable of detecting the magnetic field distribution in the X-axis, Y-axis and Z-axis directions, the system of the present invention can detect the lateral displacement more accurately. Furthermore, when the embodiments employ a plurality of magnetic sensors mounted on a vehicle along its length or width, the area in which the system can detect the magnetic field distribution generated from the magnetic marker is made broader.

Since the above embodiments are described only for examples, the present invention is not limited to the above embodiments and various modifications or alterations can be easily made therefrom by those skilled in the art without departing from the scope of the present invention.

What is claimed is:

1. A vehicle traveling position detecting system comprising:
    a magnetic sensor mounted on a vehicle for detecting a magnetic field generated by a plurality of magnetic markers/re arranged in a traveling direction of the vehicle to output a detected magnetic field signal;
    a speed sensor for detecting a traveling speed of the vehicle;
    a delay unit for delaying the detected magnetic field signal by a delay time calculated based on the detected traveling speed to output a delayed magnetic field signal;
    a subtracter for calculating a difference between the detected magnetic field signal and the delayed magnetic field signal to output a difference signal; and
    a displacement calculating unit for calculating, based on the difference signal, a displacement with respect to the one of said plurality of magnetic markers/re in a lateral direction normal to the traveling direction.

2. The vehicle travelling position detecting system as defined in claim 1, wherein the delay time D is calculated by:

$$D=L/(2\times V),$$

given L and V being a detectable distance of the one of the magnetic markers and the detected travelling speed, respectively.

3. The vehicle travelling position detecting system as defined in claim 1, wherein said magnetic sensor is selected from a magnetic array, among which said magnetic sensor outputs a highest amplitude of the detected magnetic field signal.

4. The vehicle travelling position detecting system as defined in claim 1, wherein said subtracter comprises an inverter for inverting the detected magnetic field signal to output an inverted magnetic field signal, and an adder for adding the inverted magnetic field signal and the detected magnetic field signal.

5. The vehicle traveling position detecting system according to claim 1, wherein said delayed magnetic field signal has a delay time of Ta/2, where Ta is a detectable time length, and wherein an inverted magnetic field signal outputted from said delayed magnetic field signal comprises a sinusoidal waveform having a peak with a negative polarity located between time instants $t_0+(Ta/2)$ and $t_1+(Ta/2)$.

6. The vehicle traveling position detecting system according to claim 1, wherein said subtracter comprises an inverter for calculating an inverted magnetic field signal.

7. The vehicle traveling position detecting system according to claim 1, wherein said displacement calculating unit comprises a peak detection unit and a displacement detecting unit.

8. The vehicle traveling position detecting system according to claim 1, wherein said magnetic sensor maintains a substantially constant position along a first axis and moves along a substantially straight line along a second axis by connecting each central point of each of said magnetic markers.

9. The vehicle traveling position detecting system according to claim 8, wherein said detected magnetic field has a magnetic flux density maximized at each said central point of each of said magnetic markers along said second axis and a gradual decrease in said magnetic flux density substantially proportional to a distance from said central point of each of said magnetic markers.

10. The vehicle traveling position detecting system according to claim 7, wherein said peak detection unit successively samples values of said difference signal to detect whether said values of said difference signal exceed a threshold value.

11. The vehicle traveling position detecting system according to claims 7, wherein said peak detection unit supplies a latched value to said displacement detecting unit.

12. The vehicle traveling position detecting system according to claim 1, wherein said magnetic sensor comprises a two-axis measurement sensor for detecting a magnetic field component of said magnetic field along a axis and a magnetic field component of said magnetic field along a axis.

13. A vehicle traveling position detecting system comprising:
    a magnetic sensor mounted on a vehicle for detecting a magnetic field generated by a plurality of magnetic makers arranged in a traveling direction of the vehicle to output a detected magnetic field signal;
    a speed sensor for detecting a traveling speed of the vehicle;
    a sample/hold circuit for sampling period to output a series of magnetic field signals;
    a first memory section for storing the series of sampled magnetic field signals;
    a subtracter for calculating a difference between each two of the series of sampled magnetic field signals sampled at a specified interval to output a series of difference signals;
    a second memory section for storing the series of difference signals; and
    a displacement calculating unit for calculating, based on the difference signals, a displacement with respect to the one of said plurality of magnetic markers/re in a lateral direction normal to the traveling direction.

14. The vehicle travelling position detecting system as defined in claim 13, wherein the delay time D is calculated by:

$$D=L/(2\times V),$$

given L and V being a detectable distance of the one of the magnetic markers and the detected travelling speed, respectively.

15. The vehicle travelling position detecting system as defined in claim 13, wherein said magnetic sensor is selected from a magnetic array, among which said magnetic sensor outputs a highest amplitude of the detected magnetic field signal.

16. The vehicle travelling position detecting system as defined in claim 13, wherein said subtracter comprises an inverter for inverting one of the each two of the sampled magnetic field signals to output an inverted magnetic field signal, and an adder for adding the inverted magnetic field signal and the other of the each two of sampled magnetic field signals.

17. A vehicle position detecting system, comprising:
  a magnetic sensor mounted on a vehicle for detecting a magnetic field generated by one of a plurality of magnetic markers arranged in a traveling direction of the vehicle to output a detected magnetic field signal;
  a speed sensor for detecting a traveling speed of the vehicle; and
  a data calculation unit for digitally processing and calculating a lateral displacement direction normal to said traveling direction, said data calculation unit comprising a subtracter for calculating a difference between the detected magnetic field signal and the delayed magnetic field signal to output a difference signal.

18. The vehicle position detecting system according to claim 17, wherein said data calculation unit further comprises a first storage unit, a calculation circuit, a second storage unit and a calculation unit sequentially coupled together.

19. The vehicle position detecting system according to claim 18, wherein said calculation unit comprises a peak detection unit and a displacement detecting unit.

20. The vehicle position detecting system according to claim 17, wherein said data calculation unit comprises an Analog to Digital (A/D) converter and a memory control unit.

* * * * *